Sept. 18, 1928.
F. J. BICEK
1,684,616
SICKLE BAR SECTION
Filed April 1, 1927
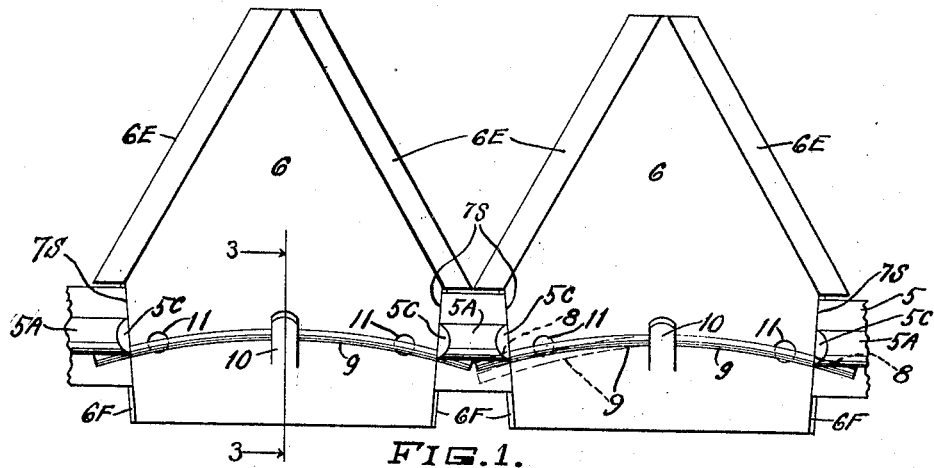
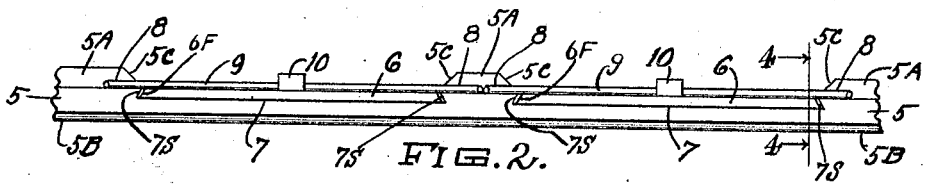
 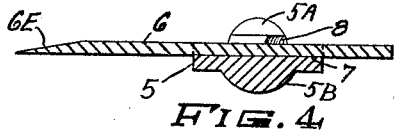
INVENTOR:
Frank J. Bicek
By David E. Carlsen
ATTORNEY.

Patented Sept. 18, 1928.

1,684,616

UNITED STATES PATENT OFFICE.

FRANK J. BICEK, OF LE SUEUR CENTER, MINNESOTA.

SICKLE-BAR SECTION.

Application filed April 1, 1927. Serial No. 180,133.

My invention relates to improvements in sickle bars and sections thereof and the main object is to provide blades or so-called sickle bar sections which are readily removable for replacement without the use of special tools, thus insuring a minimum loss of time during mowing.

In the accompanying drawing:—

Fig. 1 is a top view of a sickle bar of the usual reciprocating type and embodying two of my improved sickle bar sections.

Fig. 2 is a rear edge view of Fig. 1.

Fig. 3 is an enlarged sectional view as on line 3—3 in Fig. 1.

Fig. 4 is a sectional view as one line 4—4 in Fig. 2.

Referring to the drawing by reference numerals, 5 designates the usual reciprocating bar of a mower, reaper or similar cutting machine and reciprocated by any suitable means (not shown). In this instance the bar is flat and provided with an integral upper central rib $5^A$ and a like but larger lower rib $5^B$.

6 are the forwardly directed and tapered cutting blades having cutting edges $6^E$, and rearwardly of said cutting part the blade is tapered rearwardly preferably with beveled edges $6^F$. Said rearwardly tapered part of each blade is frictionally retained between tapered and beveled shoulders $7^S$ of a flat transverse recess 7 in the upper side of the bar. Adjacent the said beveled edges $7^S$ the rib $5^A$ is beveled outwardly slightly as at $5^C$ and at the rear side of the rib it is notched as at 8 longitudinally, angularly and rearwardly from the bevel edge $7^S$ at which edge the notch is deepest. Said notches at each side of a recess 7 are adapted to be frictionally engaged by the opposite end portions of a spring bar 9 which is sprung forward at its center to engage a struck-up tongue 10 of blade 6. It is obvious that the spring bar continuously exerts rearward pressure causing the blade 6 to be additionally frictionally retained in the recess 7 of the bar 5.

11 are a pair of preferably round apertures in each blade 6 and each located adjacent one rearwardly tapered edge and so that a nail point can be inserted in it and then by swinging or pressing the nail rearwardly against bar 9, the latter is sprung as to dotted line position in Fig. 1 and released from recess 8 of rib $5^A$. Thus the bar 9 is freed and can be removed after which a light tap on the rear end of the blade will loosen it from its seat in the recess 7. Thus it will be seen that any blade 6 is readily removed and replaced by a new one.

I claim:

1. In a sickle bar section a reciprocable bar having a series of flat recesses tapered transversely of the bar and in its upper face, a cutting blade for each said recess and having a correspondingly tapered shank adapted to be frictionally and removably retained in said bar, a longitudinal rib on the top of said bar, a lug in the upper central part of each blade and means engaging said lug and the adjacent parts of said rib for pressing and retaining each said blade in the tapered recess.

2. The structure specified in claim 1, in which said rib of the bar is provided with lateral notches at each side of a recess, said blade retaining means comprising a spring metal bar adapted to engage with its central part the forward part of said lug and its end portions sprung rearwardly to engage one in each of said notches adjacent the cutter blade, and means for facilitating the displacing of said spring bar from said position.

3. The structure specified in claim 1, in which said rib of the bar is provided with lateral notches at each side of a recess, said blade retaining means comprising a spring metal bar adapted to engage with its central part the forward part of said lug and its end portions sprung rearwardly to engage one in each of said notches adjacent the cutter blade, and means for facilitating the displacing of said spring bar from said position, said latter means consisting in providing an aperture in the blade adjacent each of the tapering edges of its shank in a location to be partially traversed by said spring bar.

In testimony whereof I affix my signature.

FRANK J. BICEK.